Figures 1, 2, 3:
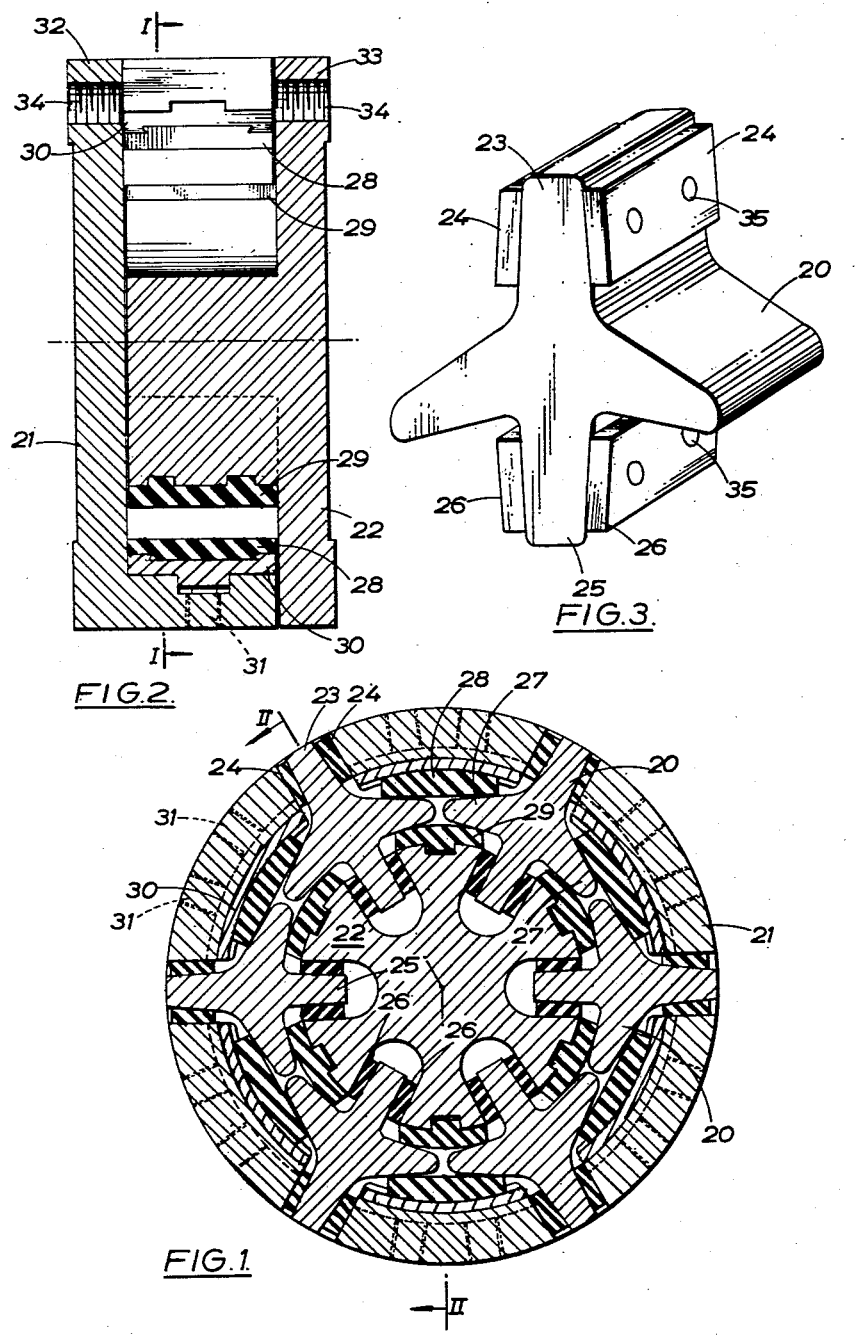

Nov. 28, 1961  N. TETLOW  3,010,296
FLEXIBLE COUPLINGS
Filed Feb. 9, 1959  9 Sheets-Sheet 1

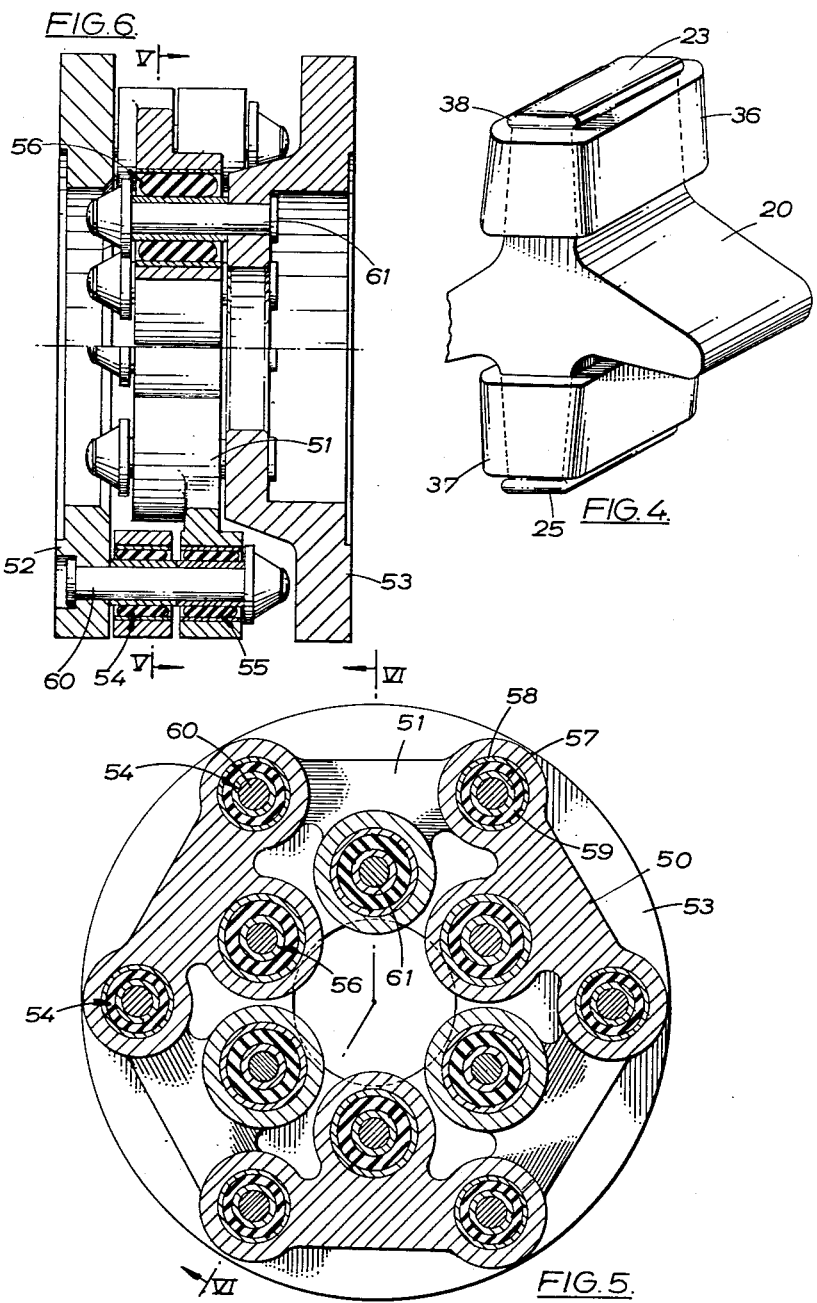

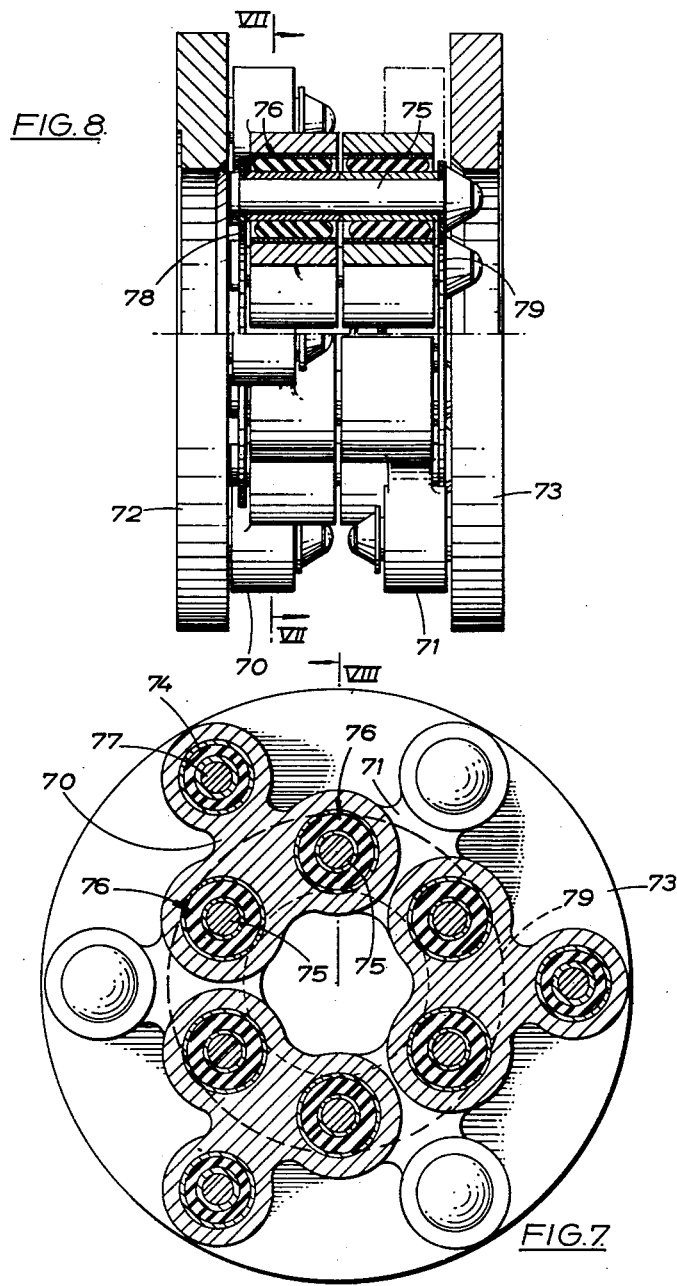

Nov. 28, 1961  N. TETLOW  3,010,296
FLEXIBLE COUPLINGS
Filed Feb. 9, 1959  9 Sheets-Sheet 7

United States Patent Office

3,010,296
Patented Nov. 28, 1961

3,010,296
FLEXIBLE COUPLINGS
Norman Tetlow, Windlehurst Cottage, High Lane,
near Stockport, England
Filed Feb. 9, 1959, Ser. No. 792,081
Claims priority, application Great Britain Apr. 23, 1958
20 Claims. (Cl. 64—19)

The invention relates to flexible rotary couplings and more particularly to couplings which are flexible in torsion such as power transmission flexible couplings of the damping or de-tuning type.

In reciprocating internal combustion engines the crank shaft generally rotates with an angular velocity which varies within each revolution so that its angular movement has an oscillatory component which may have an amplitude of several degrees. Also quite wide variations in torque of an oscillatory nature will generally occur.

It is an object of the present invention to provide a coupling which is capable of substantially absorbing angular oscillations of the driving member and is also capable of absorbing energy when the driving torque is high and releasing energy when the driving torque is low.

Such a coupling will generally have a driving member and a driven member which are capable of substantial relative angular displacement for example of the order of say 3 to 5°.

It is another object of the present invention to provide a coupling comprising a driving member and a driven member and a plurality of intermediate members, in which the torque is transmitted through the intermediate members causing the intermediate members to displace angularly relatively to the driving and driven members. This relative angular displacement of the intermediate members allows the required flexibility between the driving and driven members and smoothens the torque delivered by the prime mover.

It is a further object of the invention to provide resilient means for resisting said relative angular displacement of said intermediate members, said resilient means serving at the same time to store up and release energy.

It is a still further object of the invention to arrange precompressed rubber or rubber-like resilient means, such as rubber bushings, so as to resist said relative angular displacement of said intermediate members by substantially torsionless further compression of said resilient means.

Briefly the present invention consists in a flexible rotary coupling comprising a driving member, a driven member, a plurality of intermediate members each angularly displaceable relatively to said driving and driven members and each disposed with spaced localities thereof in force transmitting relationship with said driving and driven members for the transmission of torque therebetween, and resilient means disposed for cooperation with spaced localities of each intermediate member to resist said angular displacement thereof relative to said driving and driven members, at least one of the former spaced localities being spaced from each of the latter spaced localities.

In some embodiments of the invention the former spaced localities include each of the latter spaced localities.

Still further objects of the invention will be apparent to those skilled in the art from the following description when read in conjunction with the accompanying drawings, which serve to illustrate the invention by way of example only and do not define the scope of the invention, reference for the latter purpose being made to the appended claims.

Figure 9:
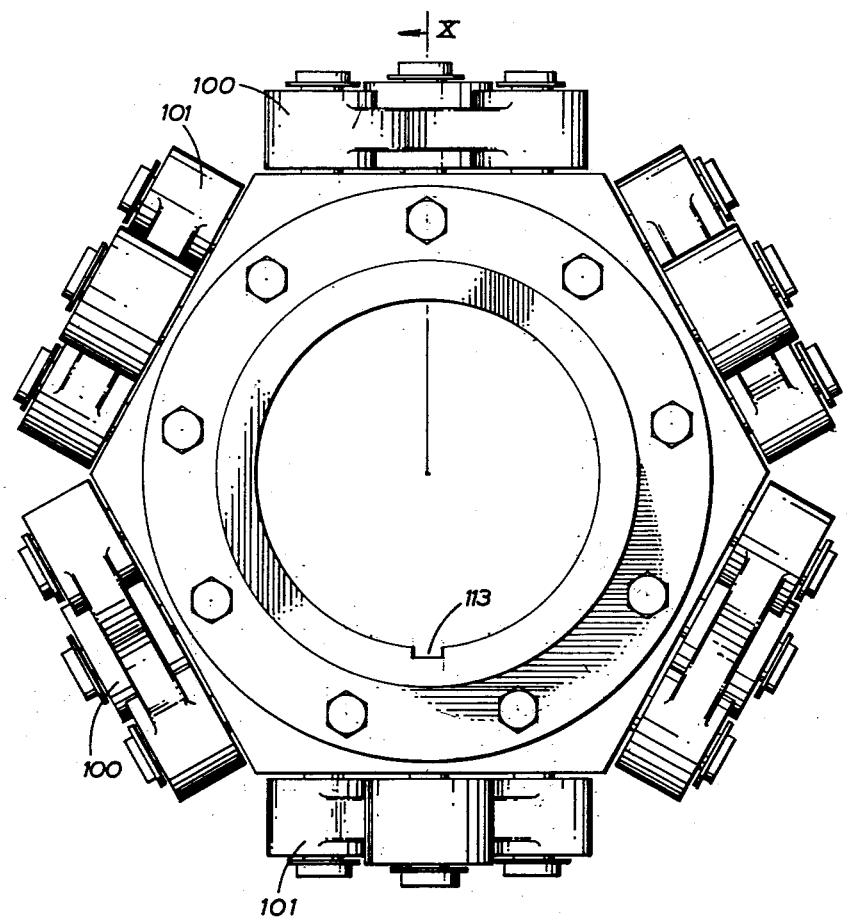
Figure 10:
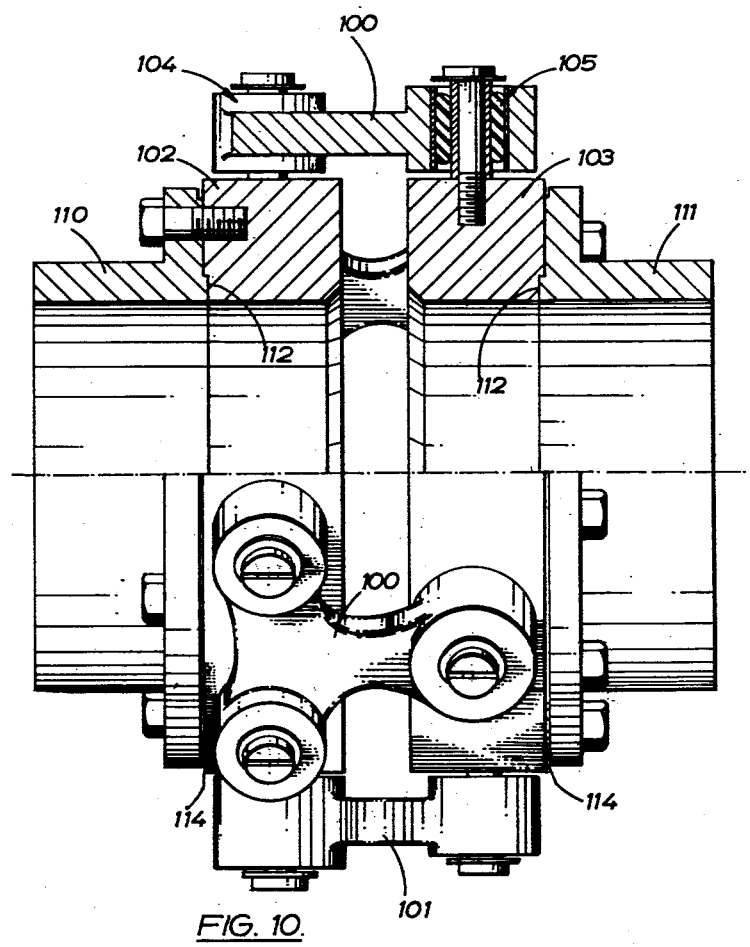
Figure 12:
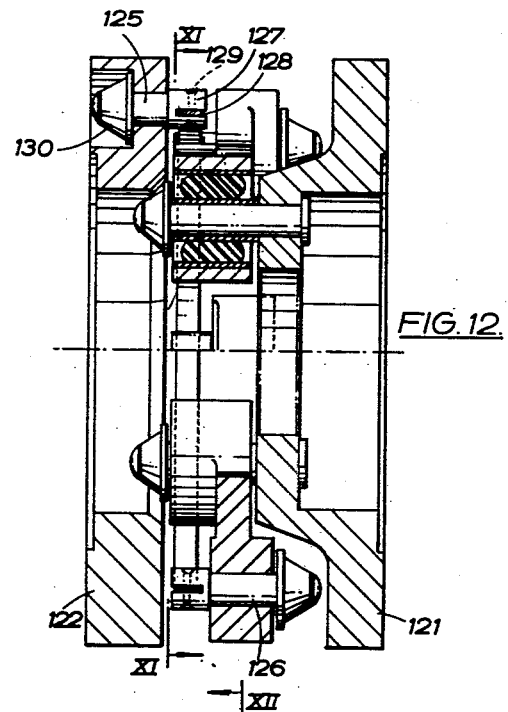
Figure 11:
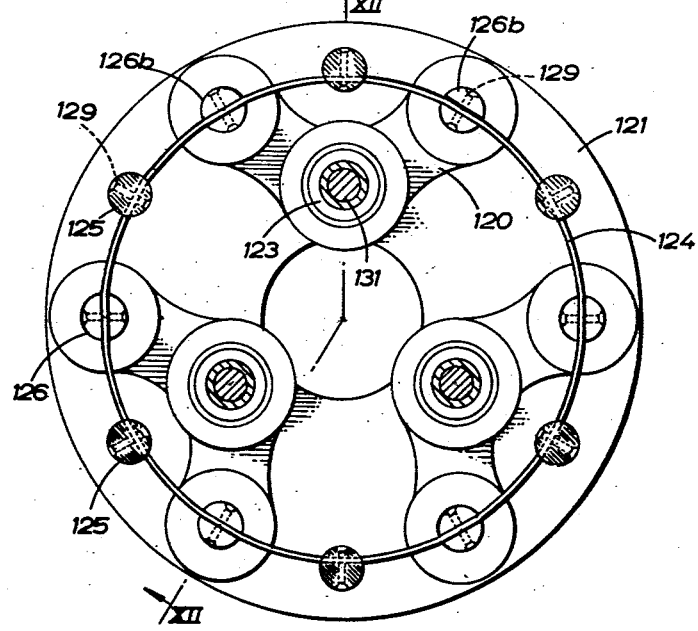
Figure 13:
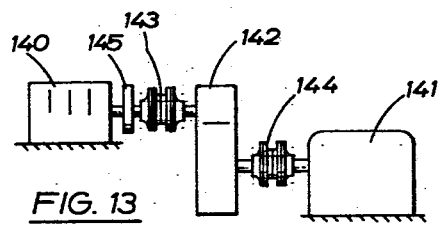
Figure 14:
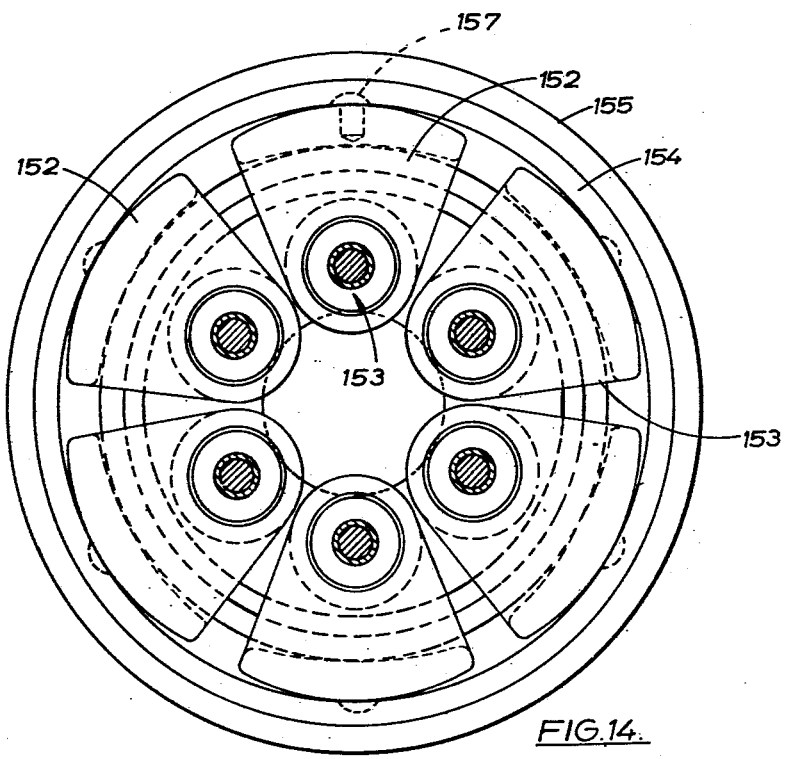
Figure 15:
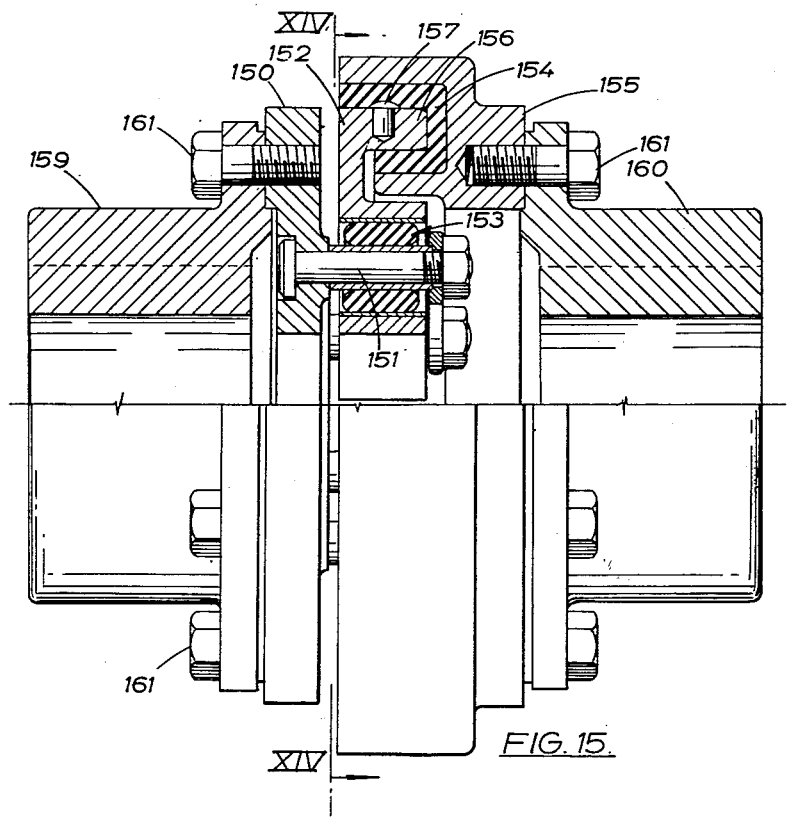
Figure 16:
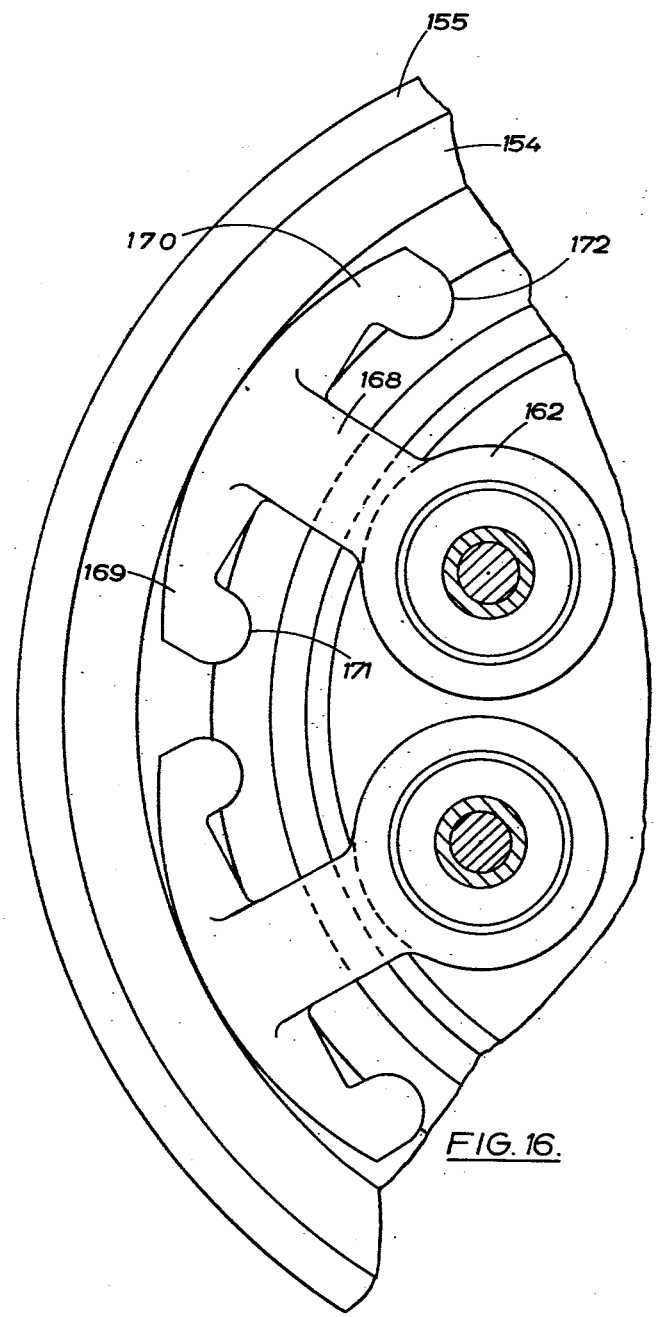

In the drawings:

FIG. 1 is a cross section on the line I—I of FIG. 2 of a flexible coupling according to a first embodiment of the invention, FIG. 2 is a cross section on the line II—II of FIG. 1 with intermediate members omitted, FIG. 3 is a perspective view of an intermediate member for the flexible coupling of FIGS. 1 and 2, FIG. 4 is a perspective view of an alternative form of intermediate member similar to FIG. 3, FIG. 5 is a cross section on the line V—V of FIG. 6, of a flexible coupling according to a second embodiment of the invention, FIG. 6 is a cross section on the line VI—VI of FIG. 5, FIG. 7 is a cross section on the line VII—VII of FIG. 8 of a third embodiment of flexible coupling according to the invention, FIG. 8 is a side view of the coupling of FIG. 7 partly sectioned on the line VIII, FIG. 9 is an end view of a fourth embodiment of a flexible coupling according to the invention, FIG. 10 is a side view of the coupling of FIG. 9 partly sectioned on the line X, FIG. 11 is a section on the line XI—XI of FIG. 12 of a fifth embodiment of flexible coupling according to the invention, FIG. 12 is a cross section on the line XII—XII of FIG. 11, FIG. 13 is a rough outline diagram for illustrating one use of flexible couplings according to the invention, FIG. 14 is a cross section on the line XIV—XIV of FIG. 15 of a sixth embodiment of the invention, FIG. 15 is a side view partly sectioned of the flexible coupling of FIG. 14, and FIG. 16 is a detail cross section of a modification of the embodiment of FIG. 14.

As will be apparent from the drawings a flexible rotary coupling according to the invention comprises a driving member, a driven member, a plurality of intermediate members disposed so as to transmit torque in either direction from the driving member to the driven member by the application by the driving member of a force to each intermediate member at one locality thereof and the application of a force by each intermediate member at a second locality thereof spaced from said first to the driven member which forces result in the application of a couple to each intermediate member, and resilient means disposed for engagement with said intermediate members at spaced localities thereof, at least one of which is also spaced from the two first-mentioned localities, to apply a counter-couple thereto in one angular direction or the other to resist angular displacement thereof resulting from said first-mentioned couple.

The terms driving member and driven member have been used for the sake of convenience only in order to distinguish these two members and it is to be understood that their functions, that is, their driving and driven functions, can be interchanged in all couplings according to the invention.

Generally, flexible couplings according to the present invention will also permit a certain amount of axial or angular misalignment or both between the driving and driven members and it may be convenient to use couplings according to the present invention in order to take up such misalignment even when torsional flexibility is not particularly required.

In general there will also be resilient means between the driving member and said one locality of each intermediate member, and further resilient means between said second locality of each intermediate member and said driven member.

When using all-metallic resilient means the characteristics of the coupling will generally be such that the torque transmitted at any instant will be approximately proportional to the relative angular displacement between the driving and driven members at that instant. However, it is often desirable to have a coupling in which the torque transmitted changes more rapidly with change of relative angular displacement for increasing values of relative angular displacement, for example, in which the torque transmitted is proportional to some power, greater than unity of the relative angular displacement between the driving and driven members. In one particular instance the torque transmitted may be substantially proportional to the cube of the relative angular displacement. Thus in preferred embodiments of the invention at least one of said resilient means is of rubber or other like resilient material. Moreover the coupling characteristics can be made substantially the same for either direction of relative angular displacement.

These variable or non-linear characteristics can be obtained to a considerable extent by choosing suitable positions relative to one another and to the axis of the coupling for the localities of each intermediate member at which forces are applied for the transmission of torque and at which the resilient means are adapted to be engaged for the application of a counter-couple and by the choice of resilient materials (such as rubber) having appropriate characteristics for that purpose. The characteristics of rubber under stress can be varied by applying precompression to the rubber, which precompression may be adjustable. Precompression of rubber resilient means may serve to reduce or may advantageously secure substantially complete elimination of backlash in the coupling.

Referring now more specifically to the embodiment of the invention shown in FIGS. 1 and 2, six intermediate members 20 of cruciform shape are arranged between a driving member 21 and a driven member 22. The driving member 21 has a series of slots or recesses in which the outer arms 23 of the intermediate members engage with the interposition of rubber pads 24. The dimensions of the slots or recesses, the arms 23 and the pads 24 are preferably such that the rubber is precompressed when the coupling is assembled. Similarly, the driven member 22 has a series of slots or recesses in which the inwardly directed arms 25 of the intermediate members engage with the interposition of further rubber pads 26 which are also preferably precompressed.

Each intermediate member 20 has two further but substantially circumferentially directed arms 27 which engage the driving member through rubber pads 28 and driven member through rubber pads 29. The rubber pads 28 are attached to mountings 30 on the driving member, grub screws 31 being arranged in the driving member for pressing the mountings 30 and the rubber pads 28 inwards in order to apply an adjustable precompression to the rubber pads 28 and 29. The driving and driven members have flanges 32 and 33 respectively which are provided with suitably arranged tapped holes 34 for coupling bolts to enable the coupling to be mounted between driving and driven shafts (not shown).

In operation, the driving member 21 applies a substantially circumferentially directed force through a pad 24 to one locality on the arm 23 of each intermediate member, and each intermediate member at a second locality thereof on the arm 25 applies a second substantially circumferentially directed force through the pads 26 to the driven member 22. These two forces acting at different localities of each intermediate member together form a couple which is applied to each intermediate member to cause it to displace angularly relatively to the driving and driven members. This angular displacement is resisted by spaced localities on the circumferentially directed arms 27 pressing on the resilient pads 28 and 29.

It is to be noted that pads 24 and 26 are provided on either side of the arms 23 and 25 of the intermediate members to enable the coupling to transmit torque in either direction and that each circumferentially directed arm 27 has a pad 28 at one side thereof and a pad 29 at the other side thereof so that a counter-couple can be applied to each intermediate member in either angular direction. The grub screws 31 enable the precompression in the rubber pads 28 and 29 to be adjusted in order to produce the desired characteristics of flexibility of the coupling.

FIG. 3 shows an intermediate member 20 to which the rubber pads 24 and 26 are attached by means of rivets or screws 35.

FIG. 4 shows a similar intermediate member 20 in which the rubber pads are in the form of rubber bands 36 and 37 which are stretched over the arms 23 and 25 of the intermediate member which in this case has protuberances 38 to prevent the rubber bands slipping off.

Although the flexible coupling of FIGS. 1 and 2 is shown with rubber pads as resilient means, it is envisaged that metallic spring means could alternatively be used, for example, small but sufficiently stiff helical springs could be arranged in suitable bores in the driving and driven members so that they will engage and press on the arms 27 of each intermediate member. Also, further bores containing similar helical springs could be arranged so that the springs press on the arms 23 and 25 of the intermediate members. Precompression in the springs will serve to reduce backlash to a minimum or substantially eliminate it altogether.

Referring now to the second embodiment of the invention, shown in FIGS. 5 and 6 of the drawings, six T-shaped intermediate members such as 50 and 51 are arranged between a driving member 52 and a driven member 53 through rubber bushings 54, 55 and 56. The rubber bushings comprise an inner sleeve 57, an outer sleeve 58 somewhat longer than the inner sleeve and an intermediate rubber bush 59. The bushing may be manufactured in such a manner that the rubber bush is in a state of precompression. Each bushing is engaged between holes in the intermediate members 50 and 51 and rivets 60 or 61 which are mounted respectively on the driving member 52 and the driven member 53. A pair of bushings 54 and 55 are mounted on each rivet 60 and a bushing 56 is mounted on each rivet 61. The bushings 54 are mounted in the intermediate members such as 50 and the bushings 55 are mounted in the intermediate members such as 51.

Thus, each intermediate member has two localities by which it engages the driving member through rubber bushings and has one locality by which it engages the driven member 53 through a rubber bushing. The driving and driven members have flanges adapted for attachment to driving and driven shafts similar to the previous embodiment.

In operation, a driving member applies a circumferential force to each intermediate member through two bushings 54 or 55 and each intermediate member applies a circumferential force through a bushing 56 to the driven member 53. These forces effectively form a couple acting on the intermediate member and this couple is resisted by a counter-couple arising by virtue of the spacing of the bushings 54 or 55 on intermediate member 50. Moreover the bushings allow torque to be transmitted in either direction.

Referring now to the embodiment of flexible coupling shown in FIGS. 7 and 8, two sets of three T-shaped intermediate members such as 70 and 71 are arranged between a driving member 72 and a driven member 73. Each intermediate member such as 70 of the first set engages the driving member 72 through a resilient bushing 74 and a rivet 77 and also engages two further rivets 75 by two resilient bushings 76. Each intermediate member such as 71 of the second set is similarly engaged between the driven member 73 and the rivets 75. The rivets 75 at each end pass through annular plates 78 and 79. These annular plates serve to keep the rivets 75 in their correct spaced relationship.

The annular plates 78 and 79 together with the rivets 75 effectively form an interlocated member between the driving and driven members so that, in operation, the driving member 72 drives the interlocated member in a similar manner to that described with reference to the previous embodiment shown in FIGS. 5 and 6, through a set of intermediate members 70. In a similar way, the interlocated member drives the driven member 73 through a further set of intermediate members 71.

In the coupling shown in FIGS. 7 and 8, the two sets of intermediate members such as 70 and 71 are staggered so that in operation the annular plates 78 and 79 serve to prevent the rivets 75 moving radially inwardly or outwardly. If further stiffness is required in the interlocated member a further annular plate through which the rivets 75 pass can be provided between the two sets of intermediate members 70 and 71.

In another embodiment of the invention, which is not shown, the two sets of intermediate members 70 and 71 are not staggered. In this case there will be little or no tendency for the rivets 75 to move radially inwardly or outwardly. The annular plates 78 and 79 serve in this case simply to prevent the rivets tilting and the individual pairs of intermediate members 70 and 71 from turning together.

The embodiment of flexible coupling shown in FIGS. 7 and 8 has the advantage over the previous embodiment, described with reference to FIGS. 5 and 6, that it can easily be designed to give more angular flexibility, there being in effect two flexible couplings in series. Also, the feature that in this embodiment the single bush engaging the driving or driven member is spaced radially outwardly relatively to the pair of bushings 76 engaging the interlocated member enables the stresses upon the rivets 75 on the inner member, that is the interlocated member, to be much reduced, there being two pins 75 to each pin 77.

Referring now to the fourth embodiment shown in FIGS. 9 and 10 of the drawings, a set of intermediate members 100 and 101 are arranged between a driving member 102 and a driven member 103. The coupling in this embodiment functions in substantially the same manner as the coupling shown in FIGS. 5 and 6 of the drawings, the main difference being in that in this embodiment the localities at which the intermediate members engage the driving and driven members through bushings 104 and 105 are substantially the same distance from the axis of the coupling, that is the intermediate members 100 and 101 are arranged more or less tangentially to the coupling instead of radially with respect to the coupling as in the previous embodiments.

Each intermediate member 100 has two bushings 104 between it and the driving member 102 and one bushing 105 between it and the driven member 103 whereas each intermediate member 101 is oppositely arranged, that is, it has one bushing attached to the driving member 102 and two bushings attached to the driven member 103. It is to be understood that all the intermediate members could be alternatively arranged the same way round, that is, they could all be attached to the driving member 102 through a pair of bushings and to the driven member 103 through a single bushing.

In the embodiment of FIG. 10 coupling heads 110 and 111 are shown bolted to suitable flange faces of the driving and driven members 102 and 103. These coupling heads are located on the driving and driven members by spigots 112. The couplings 110 and 111 are preferably first attached to driving and driven shafts (not shown) by shrinking or other suitable means, and preferably provided with a keyway (not shown) to prevent them rotating relatively to the shafts. The coupling heads are shown with recesses 114 which permit a screw-driver to be inserted therein in order to lever the driving and driven members off the spigots for removal of the coupling. The flexibility of the bushings are normally sufficient to permit enough relative axial movement of the driving and driven members for this purpose.

Referring now to the fifth embodiment of the invention, which is shown in FIGS. 11 and 12, intermediate members 120 are arranged between a driving member 121 and a driven member 122. A resilient bushing 123 is engaged between the driving member 121 and each intermediate member 120, and an annular spring strip 124 is arranged between each intermediate member and the driven member 122. The spring strip 124 is connected at spaced portions thereof to the driven member 122 and to each intermediate member by two sets of alternately arranged pins 125 and 126 respectively. The pins are enlarged at one end 127 and have a groove 128 for receiving the spring strip. Small rivets 129 are provided for holding the spring strip in place and for transmitting torque. The pins may be riveted at their other end 130 in a similar manner to the rivets 131 for attaching the bushings 123 to the driving member 121. The driven member 122 is counterbored to receive the riveted ends of the pins 125, but the intermediate members need not be counterbored to receive the riveted ends of the pins 126 if sufficient clearance is provided between the intermediate members and driving member 121. The pins 125 can be rotatable in the driven member 122, but the pins 126 need not be rotatable in the intermediate members. The grooves for the accommodation of the spring strip in the pins 125 should be slightly offset from the axis of the pins as shown. The spring strip may be of a single piece of metal as shown or alternatively may be multi-laminar.

In operation, the driving member 121 applies a substantially circumferential force to each intermediate member through the bushings 123, and each intermediate member applies a substantially circumferential force to the driven member 122 through the pins 126, spring strip 124 and pins 125 and the small rivets 129. These circumferential forces result in the application of a couple to each intermediate member, which couple is resisted by a counter-couple arising by virtue of the spacing between the pins 125 which engage the intermediate member 120 at two spaced localities thereof, for example, if the driving member applies a clockwise couple to the driven member (looking at FIG. 11), each intermediate member will be given an anti-clockwise angular displacement. Thus, the pin 126a will move inwardly and the pin 126b will move outwardly, which movement will be resisted by buckling of the spring strip 124. The pins 125 will rotate slightly and this rotation, because the grooves in the pins 125 are slightly offset, serves to permit this buckling. The coupling of FIGS. 11 and 12 as in the previously described embodiments can also transmit torque in either direction.

In an alternative arrangement the pins 125 and 126 can be fixed relatively to the respective members to which they are attached in order to simplify lubrication problems. In this case the flexibility of the spring strip between adjacent pins is relied upon to give sufficient coupling flexibility.

FIG. 13, serving to illustrate one application of couplings according to the invention, shows a reciprocating internal combustion engine 140 which drives a machine such as a compressor 141 through a gear box 142. The engine 140 is coupled to the gear box 142 through a flexible coupling 143 and the gear box 142 is coupled to the compressor 141 through a further coupling 144. The internal combustion engine 140 includes the usual flywheel 145 which serves to overcome a large proportion of the variations in torque and angular velocity produced by the internal combustion engine, but cannot remove them entirely. It is convenient to provide a coupling 143, which is a flexible coupling constructed according to the present invention, in order to reduce further the variations in torque and angular velocity transmitted to the gear box 142. If the compressor 141 is of the axial or radial flow type it will provide a more or less constant load upon the gear box, at least during a single rotation of its shaft, and thus it will be sufficient to provide a flexible coupling 144 which can take up any shaft misalignment between the gear box 142 and the compressor 141, but which has little torsional flexibility. However, if the compressor 141 is of the reciprocating type then it might well be preferable to have a coupling 144 which is also a flexible coupling according to the present invention in order to reduce the consequential varying load upon the gear box 142.

In the embodiment of flexible coupling shown in FIGS. 14 and 15 a driving member 150 carries a plurality of bolts 151. A plurality of intermediate members 152 are attached to the bolts 151 by means of resilient bushings 153. An annular resilient member 154, preferably of rubber or similar material, fits in a corresponding slot in a driven member 155 and is preferably bonded thereto. The resilient member 154 has an annular groove or recess therein into which a flange-like circumferentially extending portion 156 of each intermediate member 152 fits. A rivet 157, or the like, in the portion 156 engages the resilient member 154 so as to enable each of the intermediate members 152 to transmit a circumferentially directed force to the driven member 155 and prevent rotation of the intermediate members relatively thereto due to the portions 156 sliding in the groove or recess of the resilient member 154. The main portion 158 of the intermediate members is in effect a radially directed arm, but it extends the full circumferential width of the flange 156.

The driving and driven members 150 and 155 are mounted on coupling heads 159 and 160 by means of bolts 161 which engage in tapped holes in the driving and driven members.

In operation of the coupling of FIGS. 14 and 15, angular displacement of the intermediate members 152 relatively to the driven member 155 causes the outer ends of the flanges 156 to engage the resilient member 154 so that the resilient member 154 effectively resists angular displacement of the intermediate members. The flange 156 thus behaves in a similar manner to the circumferentially directed arms 27 of the coupling of FIGS. 1 and 2. Since the ends of the flanges 156 are only engaged by the resilient member 154 when the intermediate members are displaced through an appreciable angle relatively thereto it follows that there is little resistance to comparatively small angular displacement of the intermediate members. Thus, the torsional flexibility of the coupling of FIGS. 14 and 15 increases substantially as the angular displacement between the members 150 and 155 is increased.

FIG. 16 shows a minor modification of the embodiment of FIGS. 14 and 15. In FIG. 16 each of the intermediate members 162 has a radially inwardly directed arm 168 and also two circumferentially directed arms 169 and 170 engaged in an annular groove in a resilient member 154 bonded to the driven member 155. In the embodiment of FIG. 16 the arms 159 and 170 have inwardly directed projections 171 and 172 which function in a similar manner to the rivet 157.

In all the embodiments of rotary flexible couplings shown in the drawings the terms "driving member" and "driven member" do not limit their functions. In other words, the members 21, 52, 72, 102, 121 and 150 of the six arrangements shown could equally well be the driven members and the members 22, 53, 73, 103, 122 and 155 the driving members.

The torque transmitting characteristics of couplings according to the invention are determined by the space between the localities of the intermediate members at which the torque transmitting forces and the counter-couples are applied and their positions relative to the axis of the coupling and also by the characteristics of the resilient means of the coupling. These torque transmitting characteristics can conveniently be found and adjusted by experiment. In particular, the required precompression in rubber resilient means can be found experimentally.

All the embodiments of flexible coupling according to the invention shown in FIGS. 1 to 12 and 14 to 16 of the drawings can be constructed to have substantially the same size flange faces on the driving and driven members or alternatively one of a series of standard sizes, and also the same normal distance between the two flange faces. Thus, if it is found in one application that one particular coupling (such as 143 or 144 in FIG. 13) has not got suitable characteristics in order to satisfactorily reduce transmitted variations in torque and angular velocity, then it can readily and conveniently be replaced by another coupling with different characteristics. Also, the coupling 144 if of a type with little or no torsional flexibility can have similar dimensioned flange faces so it can be replaced by a coupling according to the present invention. Furthermore, if a flexible coupling according to the embodiment of FIGS. 1 and 2 of the drawings is used as coupling 143 or 144, the torsional characteristics can be adjusted with the coupling in situ and the value of compression of the rubber pads 28 and 29 which gives a maximum amount of damping can be found by experiment.

In practice most internal combustion engines have a torque characteristic the variations of which have a combination of a fundamental frequency and a series of harmonic frequencies. In this case a single flexible coupling cannot always be designed to damp all frequencies satisfactorily, and it will be necessary to compromise to a certain extent, that is to choose a coupling which will damp the more predominant frequency or frequencies.

It is observed that in all the embodiments illustrated, other than that of FIGS. 11 and 12, rubber or rubber-like resilient means is used to resist angular displacement of the intermediate members and that it is compression of this resilient means that produces this resistance.

In the embodiment of FIGS. 5 and 6 the resilient bushings 54 and 55 resist angular displacement of the intermediate members 50 and 57 by compression of the rubber in the bushings 54 and 55 and not by torsion thereof. The bushings 54, 55 and 56 may provide some torsional resistance to angular displacement of the intermediate members, but in general this will be small compared with the couple produced by the corresponding compression of the rubber in the bushings 54 and 55. Similar remarks apply particularly to the embodiments of FIGS. 7, 8, 9 and 10 and also to embodiments having a single resilient bushing per intermediate member, i.e. the embodiments of FIGS. 14, 15 and 16. In other words, the resistance to angular displacement of the intermediate members by said resilient means is substantially torsionless.

I claim:

1. In a flexible rotary coupling, the combination comprising two rotary coupling members; a plurality of intermediate members each disposed with spaced portions thereof in force-transmitting relationship with said coupling members for the transmission of torque therebetween and each angularly displaceable relatively to said coupling members, some of said portions of each of said intermediate members being so spaced as to enable said force transmission to apply a couple to each of said intermediate members to effect said angular displacement thereof; at least one further spaced portion displaced from said first spaced portions, and resilient means disposed for cooperation with spaced portions of each of said intermediate members to oppose said couple by resisting said angular displacement of said intermediate members.

2. In a flexible rotary coupling, the combination comprising two rotary coupling members; a plurality of intermediate members each disposed with three mutually spaced portions thereof in force-transmitting relationship with said coupling members for the transmission of torque therebetween and each angularly displaceable relatively to said coupling members, one of said portions of each of said intermediate members being so spaced from the other two as to enable said force transmission to apply a couple to each of said intermediate members to effect said angular displacement thereof; and resilient means disposed in engagement with two spaced portions of each of said intermediate members to oppose said couple by resisting said angular displacement of said intermediate members, the three first-mentioned mutually spaced portions of each intermediate member including at least one of the two last-mentioned spaced portions thereof.

3. In a flexible rotary coupling, the combination comprising two rotary coupling members; a plurality of intermediate members each disposed with two spaced portions thereof in force-transmitting relationship with said coupling members for the transmission of torque therebetween and each angularly displaceable relatively to said coupling members, said portions of each of said intermediate members being so spaced as to enable said force transmission to apply a couple to each of said intermediate members to effect said angular displacement thereof; and resilient means disposed for cooperation with two further spaced portions of each of said intermediate members to oppose said couple by resisting said angular displacement of said intermediate members, all said portions of each of said intermediate members being mutually spaced from one another.

4. In a flexible rotary coupling, the combination comprising two rotary coupling parts; a plurality of torque-transmission elements disposed between said coupling parts and angularly displaceable relatively thereto, each of said elements having at least one non-circumferentially directed arm and two oppositely and substantially circumferentially directed arms, a locality of said non-circumferentially directed arm of each of said elements and at least one other locality thereof spaced from its non-circumferentially directed arm being in force-transmitting relationship with said coupling parts for the transmission of torque therebetween; and resilient means disposed for cooperation with each of said circumferentially directed arms to resist angular displacement of each of said elements relatively to said coupling parts upon torque transmission therebetween.

5. The combination set forth in claim 4 comprising a plurality of resilient bushings each including a precompressed rubber bush, one of said resilient bushings connecting each of said non-circumferentially directed arms to one of said coupling parts.

6. The combination set forth in claim 4 in which said resilient means comprises rubber pads disposed on at least one of said coupling parts for engagement with said circumferentially directed arms of said torque-transmission elements, at least upon angular displacement thereof.

7. In a flexible rotary coupling: a first rotary coupling part having an annular groove with opposite side walls of which at least one is resilient, a second rotary coupling part, and intermediate members pivoted to said second rotary coupling part and extending into said groove and engaging said opposite side walls thereof and adapted to compress said resilient side wall on angular displacement of said intermediate members relatively to said first coupling part.

8. In a flexible rotary coupling: a first rotary coupling part having an annular groove with opposite side walls which are resilient, a second rotary coupling part, and a plurality of intermediate members pivoted to said second rotary coupling part and extending into said groove and engaging said opposite side walls thereof and adapted to compress said opposite side walls of the groove at circumferentially spaced localities thereof on angular displacement of said intermediate members relatively to said first coupling part.

9. A flexible coupling according to claim 8 in which the opening of said groove faces axially, and each of said intermediate members is pivoted to said second rotary coupling part by means of a resilient bushing and extends radially therefrom to terminate in an axially turned flange which is received in said annular groove of said first rotary coupling part.

10. In a flexible rotary coupling: a first rotary coupling part; a plurality of circumferentially spaced resilient bushings mounted on said first coupling part; a plurality of torque-transmission elements each attached to one of said resilient bushings; a second rotary coupling part; and an annular metallic spring strip connected to said second coupling part and also connected at two spaced portions of the strip to two spaced localities of each of said torque-transmission elements, which spaced localities are also spaced from said resilient bushing to which said element is attached.

11. A flexible rotary coupling comprising a driving coupling member, a driven coupling member, a plurality of sets of resilient bushings each including a precompressed rubber bush, each of said sets of bushings consisting of three mutually spaced bushings of which two are circumferentially spaced and are mounted on one of said coupling members and of which the third is mounted on the other of said coupling members, and a plurality of torque transmission elements each of which is connected to the three bushings of one of said sets of resilient bushings.

12. A flexible rotary coupling according to claim 11 in which each of said torque-transmission elements is of approximate T-shape, the ends of the cross-piece of which are attached to said two circumferentially spaced resilient bushings and the end of the base of which is attached to said third resilient bushing.

13. A flexible rotary coupling comprising first and second rotary coupling parts, first and second sets of circumferentially and equidistantly spaced pins disposed on said first and second coupling parts respectively and substantially parallel to the axis thereof, the pins of said first set being disposed at a radius different from that of the pins of said second set, a first set of resilient bushings one on each pin of said first set of pins, a second set of resilient bushings one on each pin of said second set of pins, a third set of resilient bushings one on each pin of said second set of pins, a first plurality of torque-transmission elements each attached to one bushing of said first set of bushings and to two bushings of said second set of bushings, and a second plurality of torque-transmission elements each attached to one bushing of said first set of bushings and to two bushings of said third set of bushings.

14. A flexible rotary coupling according to claim 13 in which said pins are attached by one end only to their respective coupling parts and the free ends of the pins of said first set of pins extend in an opposite axial direction to that of the free ends of the pins of said second set of pins.

15. A flexible rotary coupling according to claim 13 in which the pins of said first set of pins are disposed at a smaller radius than the pins of said second set of pins.

16. A flexible rotary coupling comprising in combination: a first rotary coupling member; a second rotary coupling member; a rotary interlocated member between said first and second rotary coupling members, a first set of circumferentially spaced pins on said first coupling member extending parallel to the axis thereof and towards said second coupling member; a second set of circumferentially spaced pins on said second coupling member extending parallel to the axis thereof and towards said first coupling member; a third set of circumferentially spaced pins on said interlocated member extending parallel to the axis thereof, said first and second sets of pins being equal in number and disposed at the same radius and said third set of pins being in number equal to twice the number of pins in each of said first and second sets of pins and disposed at a radius different from that of said first and second sets of pins; a first set of resilient bushings one on each pin of said first set of pins; a second set of resilient bushings one on each pin of said second set of pins; a third set of resilient bushings one on each pin of said third set of pins; a fourth set of resilient bushings one on each pin of said third set of pins; a first plurality of torque-transmission elements each attached to one bushing of said first set of bushings and to two bushings of said third set of bushings; and a second plurality of torque-transmission elements each attached to one bushing of said second set of bushings and to two bushings of said fourth set of bushings.

17. In a flexible rotary coupling, the combination comprising first and second rotary coupling parts; a rotary interlocated part therebetween; a first plurality of intermediate members each disposed with spaced localities thereof in force-transmitting relationship with said first coupling part and said interlocated part for the transmission of torque therebetween and each angularly displaceable relatively thereto; a second plurality of intermediate members each disposed with spaced localities thereof in force-transmitting relationship with said interlocated part and said second coupling part for the transmission of torque therebetween and each angularly displaceable relatively thereto, said localities on each of said intermediate members being so spaced as to enable said force-transmission to apply a couple to each intermediate member to effect said angular displacement thereof; and resilient means disposed for co-operation with spaced localities of each of said intermediate members, at least one of the former of said spaced localities of each intermediate member being spaced from each of the latter of said spaced localities thereof.

18. In a flexible rotary coupling, the combination comprising a rotary driving member; a rotary driven member; a plurality of intermediate members each disposed with spaced localities thereof in force-transmitting relationship with said driving and driven members for the transmission of torque therebetween and each angularly displaceable relatively thereto, said localities being so spaced that upon said torque-transmission said force-transmission effects a turning moment on each of said intermediate members to effect said angular displacement thereof; and compressible resilient means disposed for co-operation with circumferentially spaced localities of each of said intermediate members to resist said angular displacement thereof and said turning moment preponderantly by a counter-couple effected by compression of said resilient means at the latter of said spaced localities.

19. In a flexible rotary coupling, the combination comprising a rotary driving member; a rotary driven member; a plurality of intermediate members each disposed with spaced localities thereof in force-transmitting relationship with said driving and driven members for the transmission of torque therebetween and each angularly displaceable relatively thereto, said localities being so spaced that upon said torque transmission said force-transmission effects a turning moment on each of said intermediate members to effect said angular displacement thereof; and resilient means disposed for co-operation with circumferentially spaced localities of each of said intermediate members to resist substantially torsionlessly said angular displacement thereof.

20. In a flexible rotary coupling, the combination comprising two rotary coupling members; a plurality of intermediate members each disposed with a first portion thereof in force-transmitting relationship with one of said coupling members and at least a second portion thereof in force-transmitting relationship with the other of said coupling members for the transmission of torque between said coupling members, each of said intermediate members being angularly displaceable relatively to said coupling members and said first and second portions of each of said intermediate members being spaced from one another; and resilient means disposed for cooperation with circumferentially spaced portions of each of said intermediate members to resist said angular displacement thereof, each of the last-mentioned spaced portions of each of said intermediate members being spaced from at least one of said first and second portions thereof.

References Cited in the file of this patent

UNITED STATES PATENTS

| | | |
|---|---|---|
| 1,894,507 | Ainsworth | Jan. 17, 1933 |
| 2,540,703 | Wellauer | Feb. 6, 1951 |
| 2,551,837 | Holloway | May 8, 1951 |
| 2,653,457 | Guernsey et al. | Sept. 29, 1953 |
| 2,837,901 | Chapman | June 10, 1958 |
| 2,910,844 | Chapman | Nov. 3, 1959 |

FOREIGN PATENTS

| | | |
|---|---|---|
| 909,271 | Germany | Apr. 15, 1954 |